Figure 1:
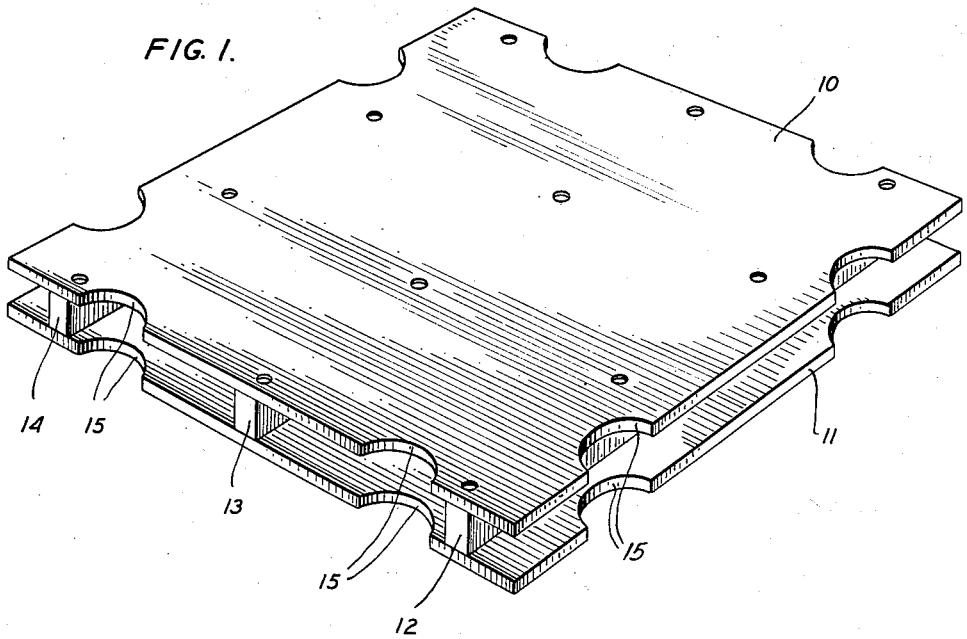

Feb. 5, 1952  F. A. VOSSENBERG  2,584,762
PALLET
Filed April 28, 1945  2 SHEETS—SHEET 1

INVENTOR
F. A. Vossenberg
BY
A. H. Golden
ATTORNEY

Feb. 5, 1952     F. A. VOSSENBERG     2,584,762
PALLET

Filed April 28, 1945     2 SHEETS—SHEET 2

INVENTOR
F. A. Vossenberg
BY
H. H. Golden
ATTORNEY

Patented Feb. 5, 1952

2,584,762

UNITED STATES PATENT OFFICE 2,584,762

PALLET

Frank A. Vossenberg, Philadelphia, Pa., assignor to The Yale & Towne Manufacturing Company, Stamford, Conn., a corporation of Connecticut Application April 28, 1945, Serial No. 590,900

1 Claim. (Cl. 248—120)

This invention relates to a method and apparatus for handling material with the aid of an industrial truck.

In warehouses and factories it has become customary in recent years to handle loads of various materials by what is termed a truck and pallet, or a truck and skid system. Thus, the material, whether it be loose, or in bags and packages, is first placed on a skid or pallet. When it is desired to transport the material, an industrial truck is moved opposite the pallet and its forks or other lifting means are inserted under the pallet. Thereafter, the forks or other lifting means of the truck are elevated and the load transported together with the pallet to any desired location. Those skilled in the art fully understand the operation of a system of the particular class described.

Before proceeding further with the description of my invention and its relation to the prior art, it may be well to indicate at this point that in this specification and in the claims appended I shall, for the sake of brevity, use the term "pallet" in its generic sense. Thus, by a pallet I include any device such as a skid or the like, on which a load is placed for movement by an industrial truck. Similarly, I shall use the term "forks" in its generic sense to indicate the load handling part of an industrial truck.

Where industrial loads are handled as I have outlined, there is a great saving effected in time and labor since relatively large loads may be handled swiftly and with ease. When materials are to be shipped, as by freight car, it is possible to ship the pallet and the load as a unit in the same manner as the pallet and load are moved about in a factory or warehouse. This method of shipping is quite satisfactory except as to the element of cost, it being appreciated that the pallet must be returned to the shipper to be reused and that the freight rates on the pallets being returned must be paid. These rates may be very high in proportion to the cost of the load handled, as will be readily appreciated. Similarly, the method requires that the shipper have on hand a great many pallets, and this of course requires a relatively large investment. For the several reasons indicated and various others known in the art, industry has in general adopted the method of unloading loads from pallets before stacking the loads in freight cars or other shipping mediums. The loading of freight cars therefore is generally a manual operation, and is of course relatively expensive and slow.

For many years, men skilled in the handling of materials have attempted to find some suitable manner of loading materials mechanically into a freight car and to stack those materials mechanically in the freight car, free of pallets, and thereby to eliminate the difficult and tedious manual procedure now required. One approach has been the development of a cheap pallet, and one inventor has even proposed a pallet made of paper to be therefore disposable. So far as I know, no satisfactory solution has resulted from this approach. It has also been proposed that the load be mechanically pushed off the pallet and on to the freight car floor or on to a load on the floor of the car. Thus, the patent art contains patents showing a truck that is adapted to lock a pallet against movement, while a pusher ram on the truck pushes the load off the pallet. This solution requires a special truck and special pallet equipment. Moreover, it is basically undesirable because loads may be damaged by the pushing required to overcome the friction of the pallet, as those skilled in the art will appreciate.

It is my opinion that my invention to be hereinafter described, contributes a very simple solution to the long standing problem I have thus far outlined. In brief, I have conceived a method for the handling of materials that comprises lifting a load from a pallet by the wedging and pushing of the forks of the truck between the pallet and the load. At this point it will be well to reiterate that I herein use the term "pallet" and "forks" as I have already outlined.

More particularly, my invention resides in a pallet so constructed that the lifting forks of a truck may readily enter under the load in a position to be wedged between the load and the pallet for lifting the load off the pallet.

My invention resides also in the combination of a pallet and spacer, with the spacer overlying and extending beyond certain surfaces of the pallet so that the lifting forks of a truck may enter under the spacer and lift it relatively to the pallet where it overlies the pallet. Thereafter, the forks may be wedged or pushed into position between the pallet and spacer for lifting the spacer and the load off the pallet.

My invention resides further in a method of handling a load by a fork truck and pallets.

I have thus described generally the main features of my invention in order that a better understanding of the relation of my invention to the prior art may be had. There are of course additional valuable features in my invention that I have not, up to this point, outlined, because those features will best be understood from the specific disclosure that follows. Naturally, I consider my contribution to the art to be of considerable breadth, and I shall solicit the grant of patent claims that will prevent the appropriation of my invention by those skilled in the art in forms varying mechanically from the particular form of my invention hereinafter set forth.

Figure 2:
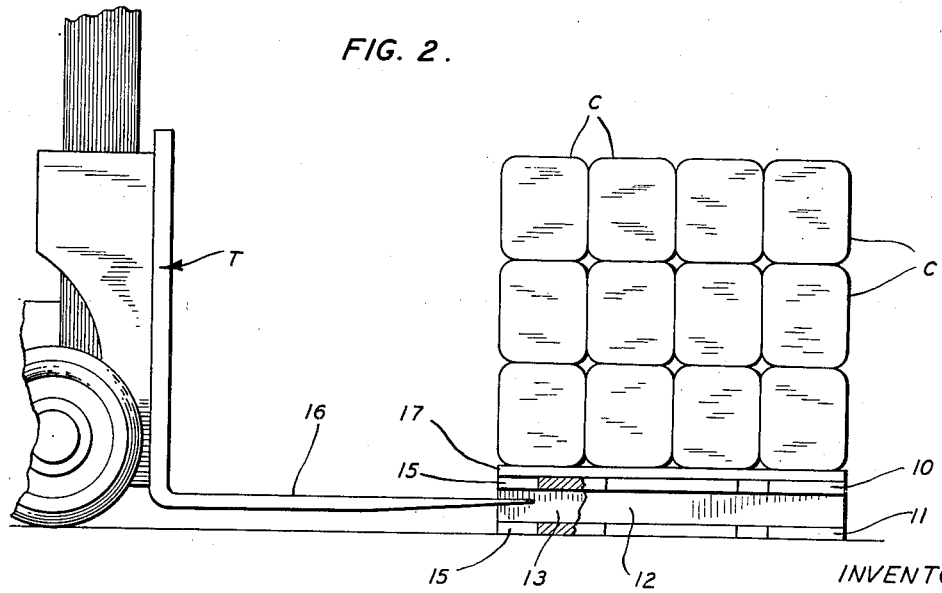
Figure 3:
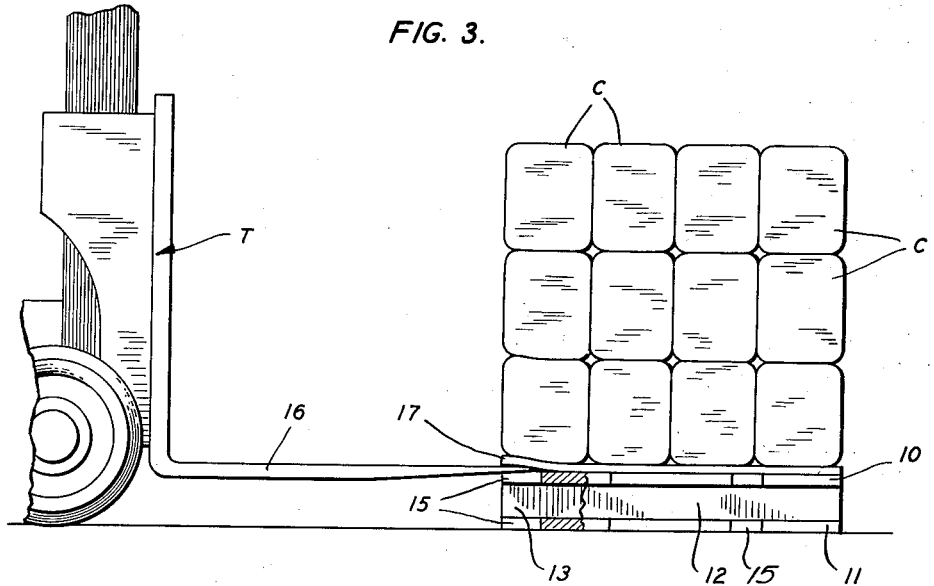
Figure 4:
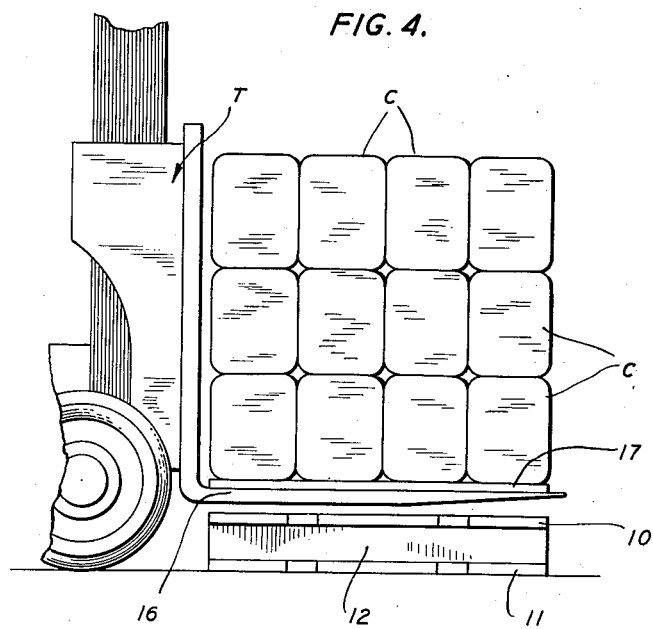

Referring now to the drawings, Fig. 1 is a perspective view of the pallet of my invention. Fig. 2 illustrates the relation of the forks of a lift truck to the pallet of Fig. 1 and to the spacer plate and load deposited on the pallet. Figs. 3 and 4 are further views of the parts of Fig. 2 showing the manner in which the lift forks of the truck are inserted between the pallet and the load.

Referring now more particularly to the drawings, the pallet of my invention is of the general type well known in the art and having upper and lower floors 10 and 11 held in spaced and assembled relation by stringers or spacers 12, 13 and 14. For the purposes of this invention, the edges of the pallet are scalloped or cut out at several points 15 for a purpose to be indicated presently.

At the present time, it is customary to place a load directly on the upper floor 10 of the pallet, and then to lift the pallet and load by inserting between the floors of the pallet lifting forks 16 of a standard type of truck T. In accordance with the teachings of this invention, the load, instead of being placed directly on the upper floor 10 of the pallet, is placed on some sort of spacer plate designated by reference numeral 17. In actual operation I have used a spacer plate formed of corrugated paper, of cardboard, and even plywood.

The load, here comprising a series of cartons C, is placed on the spacer plate 17 as illustrated. It will be noted that the spacer plate 17 overlies certain of the cutout or scalloped portions 15 of the pallet. Therefore, when the forks 16 of the truck T are placed in the position of Fig. 2 relatively to the scalloped or cutout portions 15, and are then raised to the position of Fig. 3, the said forks will actually separate the spacer plate 17 from the pallet. Also, the forks 16 will, as illustrated in Fig. 3, be in a position to be wedged or pushed further to the right so as to move into position between the spacer 17 and the pallet. This movement of the forks is possible because there is relatively little friction between the steel of the forks and the paper and/or wood surfaces of the spacer and pallet. Of course, when the forks are inserted fully into a position between the spacer and the pallet, the forks may be elevated as shown in Fig. 4 to remove the load entirely from the pallet.

It will be well to indicate at this point that the lower cutouts 15 are used, not only to obtain reversability of the pallet, but to assist in the positioning of the forks of the truck. Thus, the operator of the truck will not be able, ordinarily, to see the upper cutouts and to register his forks relatively thereto. He will, however, be able to see the lower cutouts, and by registering his forks relatively to the said lower cutouts, he will correctly position the forks under the spacer plate. As shown, my pallet is designed for coaction with a truck having but two forks, but naturally a truck with more forks may be used by increasing the number of cutouts 15. It will be well also to indicate that, frequently, it will be possible to dispense with the cutouts 15 in the pallet by merely extending the spacer plate beyond the pallet into overlying relation thereto and for cooperation with the forks. Of course, the preferred form of the invention utilizes the scalloped or cutout portions 15 as has been emphasized hereinabove.

I believe that those skilled in the art will now readily appreciate that by the simple addition of the spacer plate in overhanging relation to portions of the pallet, I am able to utilize the forks of a truck for lifting the spacer and its load off the pallet.

I now claim:

In a combination of the class described, a pallet having upper and lower load supporting floors held in spaced relation for the insertion of lifting forks or the like therebetween, each of said floors having particularly formed vertically aligned and relatively shallow scallops in at least the forward edges of the said upper and lower floors, said load supporting floors being each adapted to have applied directly thereto a load spacer and to have the load deposited on said load spacer whereby to space the load from the load supporting floor, the said load spacer having portions thereof overlying the said relatively shallow scallops particularly formed in the edges of said load supporting floors whereby the forks of a lift truck when raised upwardly in registry with said scallops will pass through said scallops to contact the under surface of said load spacer, substantially for the purpose described.

FRANK A. VOSSENBERG.

REFERENCES CITED

The following references are of record in the file of this patent:

UNITED STATES PATENTS

| Number | Name | Date |
| --- | --- | --- |
| 699,475 | Bechtel | May 6, 1902 |
| 1,018,087 | Staude | Feb. 20, 1912 |
| 1,741,189 | Jencks | Dec. 31, 1929 |
| 1,835,825 | Thierry | Dec. 8, 1931 |
| 1,890,143 | Bales | Dec. 6, 1932 |
| 1,942,870 | Mathews | Jan. 9, 1934 |
| 2,119,112 | Mitchell | May 31, 1938 |
| 2,186,463 | Maine | Jan. 9, 1940 |
| 2,226,294 | Erickson | Dec. 24, 1940 |
| 2,302,137 | Neuman | Nov. 17, 1942 |
| 2,328,397 | Neuman | Aug. 31, 1943 |
| 2,371,106 | Lewis et al. | Mar. 6, 1945 |
| 2,371,878 | Cruickshank | Mar. 20, 1945 |
| 2,372,055 | Braun | Mar. 20, 1945 |
| 2,412,184 | Ulinski | Dec. 3, 1946 |